US011900854B1

(12) United States Patent
Lee et al.

(10) Patent No.: US 11,900,854 B1
(45) Date of Patent: Feb. 13, 2024

(54) DISPLAY DEVICE AND METHOD FOR DRIVING DISPLAY PANEL

(71) Applicant: HIMAX TECHNOLOGIES LIMITED, Tainan (TW)

(72) Inventors: Cheng-Hsun Lee, Tainan (TW); Tsai Hsing Chen, Tainan (TW); Cheng Che Tsai, Tainan (TW); Ching-Wen Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/336,930

(22) Filed: Jun. 16, 2023

(30) Foreign Application Priority Data

Aug. 26, 2022 (TW) .................................. 111132267

(51) Int. Cl.
*G09G 3/20* (2006.01)

(52) U.S. Cl.
CPC ... *G09G 3/2074* (2013.01); *G09G 2320/0209* (2013.01); *G09G 2320/0242* (2013.01)

(58) Field of Classification Search
CPC ......... G09G 3/2074; G09G 2320/0209; G09G 2320/0242
See application file for complete search history.

(56) References Cited

U.S. PATENT DOCUMENTS

| | | | | |
|---|---|---|---|---|
| 2017/0018219 | A1 | 1/2017 | Wang et al. | |
| 2018/0166028 | A1 | 6/2018 | Sun et al. | |
| 2019/0140030 | A1* | 5/2019 | Huangfu | H10K 59/131 |
| 2020/0211163 | A1* | 7/2020 | Chien | G09G 3/2003 |
| 2022/0130314 | A1* | 4/2022 | Hong | G09G 3/2003 |
| 2022/0398988 | A1* | 12/2022 | Xiao | G09G 3/3406 |

FOREIGN PATENT DOCUMENTS

| | | | | | |
|---|---|---|---|---|---|
| CN | 110134353 | B | * | 4/2021 | G02F 1/1333 |
| TW | 201933306 | A | | 8/2019 | |
| WO | WO-2005111705 | A1 | * | 11/2005 | G02F 1/133514 |

* cited by examiner

*Primary Examiner* — Ricardo Osorio
(74) *Attorney, Agent, or Firm* — CKC & Partners Co., LLC

(57) ABSTRACT

A display device includes a display panel and a circuit. For a first sub-pixel, the circuit obtains a corresponding second sub-pixel. The circuit calculates a first compensation value according to the grays levels of the first sub-pixel and the second sub-pixel, and calculates a second compensation value according to the polarity states of the first sub-pixel and the second sub-pixel and the difference between the gray levels of the two sub-pixels. The circuit also calculates a gain according to the position of the first sub-pixel, compensates the gray level to the first sub-pixel according to the first compensation value, the second compensation value and the gain to obtain an output gray level, and drives the first sub-pixel according to the output gray level.

18 Claims, 7 Drawing Sheets

300

| | 0 | 32 | 64 | 96 | 128 | 192 | 256 | 320 | 384 | 448 | 512 | 576 | 640 | 704 | 768 | 832 | 896 | 960 | 1023 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 32 | 2 | 0 | -2 | -4 | -6 | -10 | -14 | -20 | -26 | -32 | -5 | -32 | -30 | -30 | -30 | -22 | -30 | -32 | -2 |
| 64 | 6 | 2 | 0 | -2 | -4 | -8 | -10 | -18 | -22 | -28 | -4 | -30 | -26 | -34 | -30 | -28 | -30 | -34 | -8 |
| 96 | 10 | 6 | 2 | 0 | -2 | -6 | -10 | -14 | -18 | -22 | -4 | -26 | -26 | -28 | -28 | -26 | -30 | -34 | -20 |
| 128 | 15 | 10 | 6 | 2 | 0 | -4 | -8 | -12 | -16 | -20 | -4 | -24 | -24 | -26 | -28 | -28 | -32 | -36 | -28 |
| 192 | 29 | 22 | 14 | 10 | 6 | 0 | -4 | -8 | -12 | -16 | -5 | -22 | -24 | -26 | -28 | -30 | -34 | -40 | -42 |
| 256 | 41 | 34 | 24 | 18 | 12 | 6 | 0 | -4 | -10 | -12 | -5 | -20 | -22 | -26 | -28 | -32 | -38 | -46 | -54 |
| 320 | 55 | 44 | 32 | 26 | 20 | 12 | 4 | 0 | -4 | -8 | -5 | -16 | -18 | -24 | -26 | -32 | -38 | -48 | -62 |
| 384 | 61 | 52 | 40 | 32 | 26 | 18 | 10 | 6 | 0 | -4 | -5 | -12 | -16 | -20 | -26 | -32 | -40 | -50 | -68 |
| 448 | 66 | 56 | 44 | 36 | 30 | 22 | 14 | 8 | 4 | 0 | -5 | -8 | -12 | -18 | -22 | -30 | -38 | -50 | -72 |
| 512 | 80 | 63 | 50 | 41 | 36 | 27 | 18 | 12 | 8 | 2 | 0 | -6 | -10 | -16 | -20 | -26 | -34 | -48 | -70 |
| 576 | 66 | 58 | 48 | 42 | 36 | 28 | 20 | 16 | 12 | 8 | 4 | 0 | -4 | -10 | -14 | -20 | -30 | -42 | -64 |
| 640 | 61 | 56 | 48 | 40 | 36 | 28 | 24 | 18 | 14 | 10 | 6 | 4 | 0 | -4 | -10 | -16 | -24 | -34 | -56 |
| 704 | 57 | 52 | 46 | 40 | 36 | 28 | 24 | 20 | 16 | 14 | 10 | 6 | 4 | 0 | -4 | -10 | -16 | -26 | -46 |
| 768 | 50 | 48 | 42 | 38 | 34 | 28 | 24 | 22 | 18 | 14 | 12 | 10 | 6 | 4 | 0 | -4 | -10 | -18 | -36 |
| 832 | 44 | 42 | 36 | 34 | 30 | 26 | 24 | 20 | 18 | 16 | 12 | 10 | 8 | 6 | 2 | 0 | -4 | -12 | -26 |
| 896 | 38 | 36 | 32 | 28 | 26 | 24 | 22 | 20 | 18 | 16 | 14 | 12 | 10 | 8 | 6 | 4 | 0 | -4 | -14 |
| 960 | 30 | 24 | 22 | 20 | 20 | 18 | 16 | 14 | 14 | 12 | 10 | 10 | 8 | 8 | 6 | 4 | 2 | 0 | -6 |
| 1023 | 0 | 0 | 0 | 0 | 0 | 0 | 0 | 0 | 0 | 0 | 0 | 0 | 0 | 0 | 0 | 0 | 0 | 0 | 0 |

FIG. 3

401

| ++ | |
|---|---|
| | 0 |
| 0 | 1 |
| 32 | 1 |
| 64 | 2 |
| 96 | 3 |
| 128 | 4 |
| 192 | 7 |
| 256 | 9 |
| 320 | 12 |
| 384 | 13 |
| 448 | 14 |
| 512 | 17 |
| 576 | 14 |
| 640 | 13 |
| 704 | 12 |
| 768 | 11 |
| 832 | 10 |
| 896 | 9 |
| 960 | 7 |
| 1023 | 0 |

402

| -- | |
|---|---|
| | 0 |
| 0 | 3 |
| 32 | 3 |
| 64 | 3 |
| 96 | 4 |
| 128 | 4 |
| 192 | 6 |
| 256 | 7 |
| 320 | 8 |
| 384 | 9 |
| 448 | 9 |
| 512 | 11 |
| 576 | 9 |
| 640 | 9 |
| 704 | 8 |
| 768 | 8 |
| 832 | 7 |
| 896 | 7 |
| 960 | 6 |
| 1023 | 0 |

403

| +- | |
|---|---|
| | 0 |
| 0 | 1 |
| 32 | 2 |
| 64 | 3 |
| 96 | 4 |
| 128 | 6 |
| 192 | 10 |
| 256 | 13 |
| 320 | 18 |
| 384 | 19 |
| 448 | 21 |
| 512 | 25 |
| 576 | 21 |
| 640 | 19 |
| 704 | 18 |
| 768 | 16 |
| 832 | 14 |
| 896 | 12 |
| 960 | 10 |
| 1023 | 0 |

404

| -+ | |
|---|---|
| | 0 |
| 0 | 2 |
| 32 | 3 |
| 64 | 3 |
| 96 | 4 |
| 128 | 4 |
| 192 | 6 |
| 256 | 7 |
| 320 | 9 |
| 384 | 10 |
| 448 | 10 |
| 512 | 12 |
| 576 | 10 |
| 640 | 10 |
| 704 | 9 |
| 768 | 8 |
| 832 | 8 |
| 896 | 7 |
| 960 | 6 |
| 1023 | 0 |

FIG. 4

500

| | 0 | 32 | 64 | 128 | 256 | 384 | 512 | 640 | 896 | 1152 | 1408 | 1664 | 1920 |
|---|---|---|---|---|---|---|---|---|---|---|---|---|---|
| 0 | 512 | 512 | 512 | 512 | 512 | 512 | 512 | 558 | 604 | 650 | 634 | 618 | 600 |
| 128 | 512 | 512 | 512 | 512 | 512 | 512 | 512 | 550 | 587 | 625 | 609 | 593 | 575 |
| 256 | 512 | 512 | 512 | 512 | 512 | 512 | 512 | 541 | 570 | 600 | 584 | 568 | 550 |
| 384 | 512 | 512 | 512 | 512 | 512 | 512 | 512 | 527 | 541 | 556 | 548 | 540 | 531 |
| 640 | 512 | 512 | 512 | 512 | 512 | 512 | 512 | 512 | 512 | 512 | 512 | 512 | 512 |
| 896 | 512 | 512 | 512 | 512 | 512 | 512 | 512 | 512 | 512 | 512 | 512 | 512 | 512 |
| 1152 | 512 | 512 | 512 | 512 | 512 | 512 | 512 | 512 | 512 | 512 | 512 | 512 | 512 |
| 1664 | 512 | 512 | 512 | 512 | 512 | 512 | 512 | 477 | 442 | 406 | 414 | 422 | 431 |
| 2176 | 512 | 512 | 512 | 512 | 512 | 512 | 512 | 442 | 372 | 300 | 316 | 332 | 350 |

| | 2176 | 2432 | 2688 | 2944 | 3200 | 3328 | 3456 | 3584 | 3712 | 3776 | 3808 | 3840 |
|---|---|---|---|---|---|---|---|---|---|---|---|---|
| 0 | 616 | 632 | 650 | 604 | 558 | 512 | 512 | 512 | 512 | 512 | 512 | 512 |
| 128 | 591 | 607 | 625 | 588 | 550 | 512 | 512 | 512 | 512 | 512 | 512 | 512 |
| 256 | 566 | 582 | 600 | 571 | 542 | 512 | 512 | 512 | 512 | 512 | 512 | 512 |
| 384 | 539 | 547 | 556 | 542 | 527 | 512 | 512 | 512 | 512 | 512 | 512 | 512 |
| 640 | 512 | 512 | 512 | 512 | 512 | 512 | 512 | 512 | 512 | 512 | 512 | 512 |
| 896 | 512 | 512 | 512 | 512 | 512 | 512 | 512 | 512 | 512 | 512 | 512 | 512 |
| 1152 | 512 | 512 | 512 | 512 | 512 | 512 | 512 | 512 | 512 | 512 | 512 | 512 |
| 1664 | 423 | 415 | 406 | 441 | 476 | 512 | 512 | 512 | 512 | 512 | 512 | 512 |
| 2176 | 334 | 318 | 300 | 370 | 440 | 512 | 512 | 512 | 512 | 512 | 512 | 512 |

FIG. 5

DISPLAY DEVICE AND METHOD FOR DRIVING DISPLAY PANEL

RELATED APPLICATIONS

This application claims priority to Taiwan Application Serial Number 111132267 filed Aug. 26, 2022, which is herein incorporated by reference.

BACKGROUND

Field of Invention

This disclosure is related to a method for driving a display device and display panel that can avoid crosstalk.

Description of Related Art

In a display panel, crosstalk is generated when the image in one area of the screen affects the brightness of adjacent areas. Crosstalk can be classified into two types: horizontal and vertical. Vertical crosstalk is commonly caused by capacitive coupling between data lines and pixel electrodes, which results in adjacent pixels not accurately displaying gray levels and producing too bright or too dark deviations. When the capacitance between the data lines and the pixel electrodes is too high, high voltage in one area will change the voltage of the pixel electrodes above and below it, causing the color of the top and bottom screens to become brighter or darker. In addition, polarity reversal of the pixels also changes the voltage on the pixel electrodes, which may lead to vertical crosstalk.

SUMMARY

Embodiments of the present disclosure provide a display device including the following component. A display panel includes multiple sub-pixels and multiple data lines in which each of the sub-pixels is connected to one of the data lines. A circuit is configured to obtain an image having multiple gray levels corresponding to the sub-pixels respectively. For a first sub-pixel of the sub-pixels, the circuit is configured to obtain a second sub-pixel correspondingly. The circuit is configured to calculate a first compensation value according to the gray level corresponding to the first sub-pixel and the gray level corresponding to the second sub-pixel. The circuit is also configured to calculate a second compensation value according to a polarization state of the first sub-pixel, a polarization state of the second sub-pixel, and a difference between the gray level corresponding to the first sub-pixel and the gray level corresponding to the second sub-pixel. The circuit is configured to calculate a gain according to a position of the first sub-pixel. The circuit is configured to compensate the gray level corresponding to the first sub-pixel according to the first compensation value, the second compensation value, and the gain to obtain an output gray level, and drive the first sub-pixel according to the output gray level.

In some embodiments, the first sub-pixel is located on a first data line of the data lines, and the first data line is adjacent to a second data line and a third data line. In a current frame, a polarization state of the first data line is identical to a polarization state of the second data line, and the polarization state of the first data line is different from a polarization state of the third data line.

In some embodiments, the polarization state of the first data line in the current frame is different from the polarization state of the first data line in a previous frame. The polarization state of the second data line in the current frame is different from the polarization state of the second data line in the previous frame. The polarization state of the third data line in the current frame is different from the polarization state of the third data line in the previous frame.

In some embodiments, the circuit is further configured to input the gray level corresponding to the first sub-pixel and the gray level corresponding to the second sub-pixel into a gray-level lookup table to obtain the first compensation value.

In some embodiments, the first compensation value is positive when the gray level corresponding to the first sub-pixel is greater than the gray level corresponding to the second sub-pixel. The first compensation value is negative when the gray level corresponding to the first sub-pixel is less than the gray level corresponding to the second sub-pixel.

In some embodiments, the circuit is configured to select one of multiple polarization lookup tables according to the polarization state of the first sub-pixel and the polarization state of the second sub-pixel. The circuit is configured to input an absolute difference between the gray level corresponding to the first sub-pixel and the gray level corresponding to the second sub-pixel into the selected polarization lookup table to obtain the second compensation value.

In some embodiments, multiple values in the selected polarization lookup tables are determined based on a concave function of the absolute difference.

In some embodiments, the circuit is configured to input a first coordinate and a second coordinate of the first sub-pixel into a position lookup table to obtain the gain.

In some embodiments, the circuit is configured to multiply the second compensation value with the gain to obtain a product, and add the gray level of the first sub-pixel, the product, and the first compensation value to obtain the output gray level.

From another aspect, embodiments of the present disclosure provide a method for driving a display panel. The method is performed by a circuit. The display panel includes multiple sub-pixels and multiple data lines, and each of the sub-pixels is connected to one of the data lines. The method includes: obtaining an image having multiple gray levels corresponding to the sub-pixels respectively; obtaining a second sub-pixel of the sub-pixels for a first sub-pixel of the sub-pixels; calculating a first compensation value according to the gray level corresponding to the first sub-pixel and the gray level corresponding to the second sub-pixel; calculating a second compensation value according to a polarization state of the first sub-pixel, a polarization state of the second sub-pixel, and a difference between the gray level corresponding to the first sub-pixel and the gray level corresponding to the second sub-pixel; calculating a gain according to a position of the first sub-pixel; and compensating the gray level corresponding to the first sub-pixel according to the first compensation value, the second compensation value, and the gain to obtain an output gray level, and driving the first sub-pixel according to the output gray level.

BRIEF DESCRIPTION OF THE DRAWINGS

The invention can be more fully understood by reading the following detailed description of the embodiment, with reference made to the accompanying drawings as follows.

FIG. 3 is a diagram of an example of a gray-level lookup table 300 according to an embodiment.

FIG. 4 is a diagram of an example of polarization lookup tables according to an embodiment.

FIG. 5 is a diagram of an example of position lookup table according to an embodiment.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
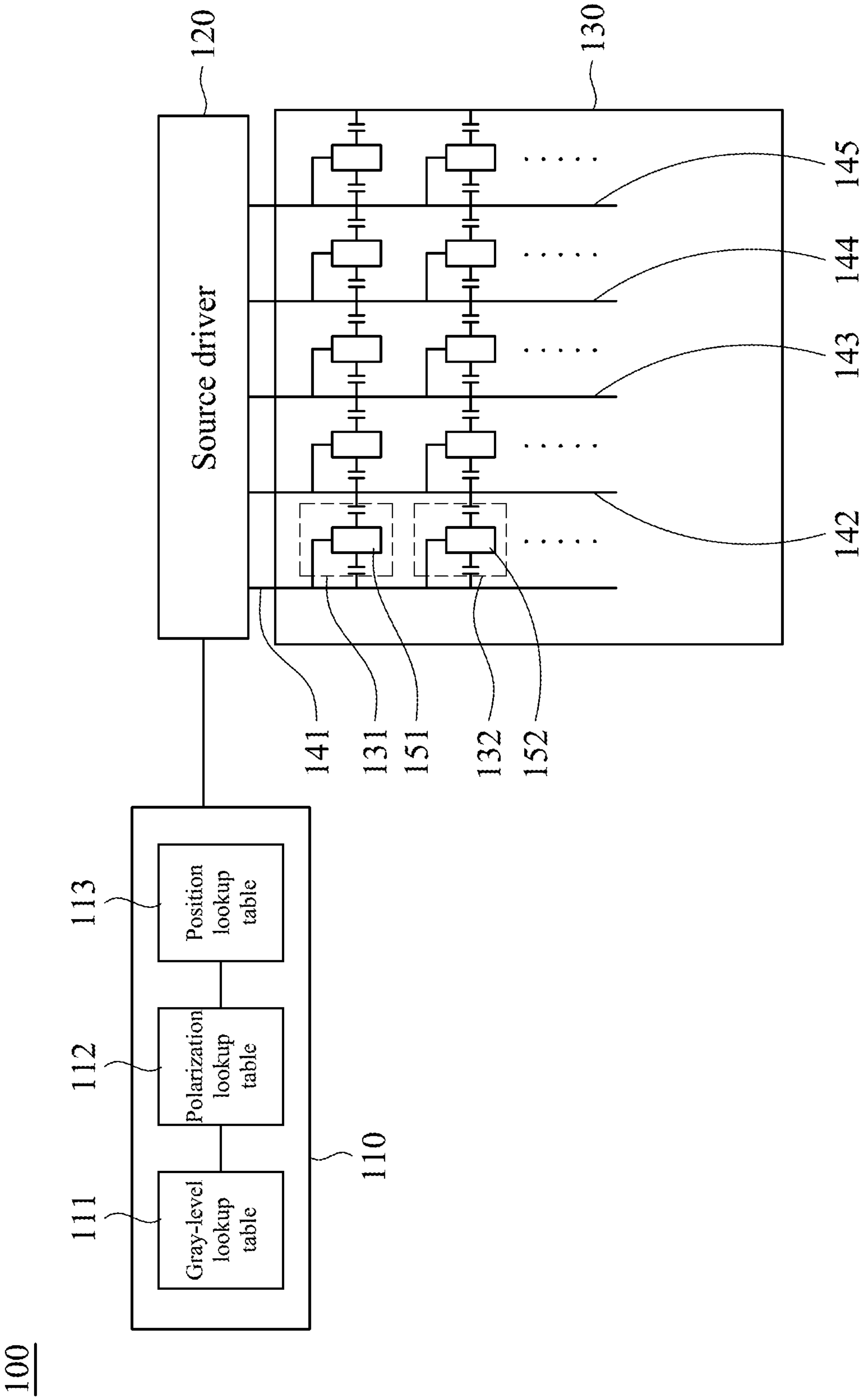
FIG. 1 is a schematic diagram of a display device according to an embodiment.

FIG. 1 is a schematic diagram of a display device according to an embodiment. Referring to FIG. 1, a display device 100 includes a circuit 110, a source driver 120, and a display panel 130. In some embodiments, the circuit 110 may be a time controller, but the present disclosure is not limited to this. The display panel 130 includes multiple sub-pixels (e.g., sub-pixels 131 and 132) and multiple data lines 141-145. For simplicity, gate driver, gate lines, thin film transistors, and other components are not shown in FIG. 1. The sub-pixel 131 includes a pixel electrode 151, and the sub-pixel 132 includes a pixel electrode 152. The pixel electrodes and are capacitively coupled to adjacent data lines, so voltage changes on the data lines affect the voltage on the pixel electrodes and. Taking into account the phenomenon of polarity inversion, the polarization state on adjacent data lines also affects the voltage on the pixel electrodes.

Figure 2A:
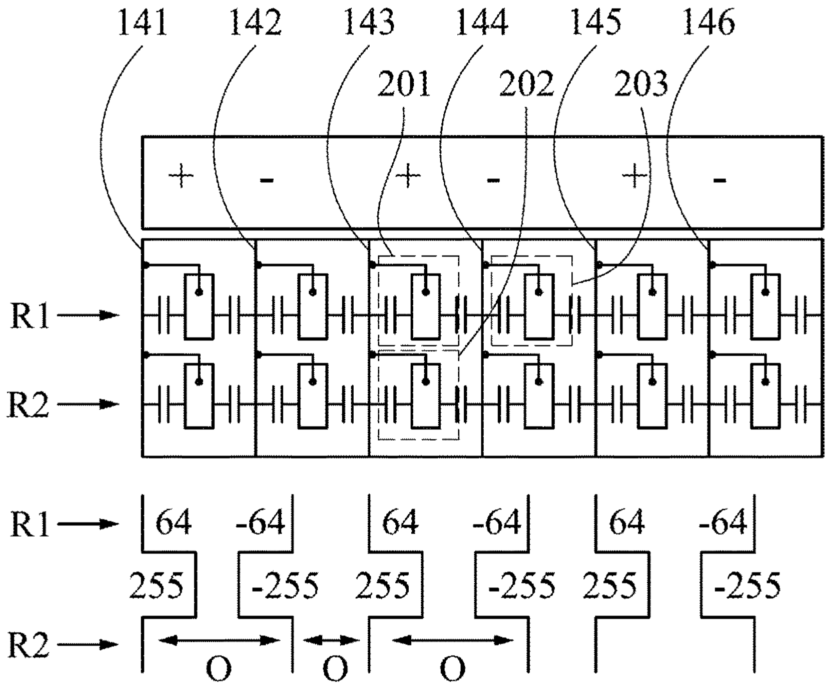
FIG. 2A and FIG. 2B are schematic diagrams of the polarization states on the data lines.
Figure 2B:
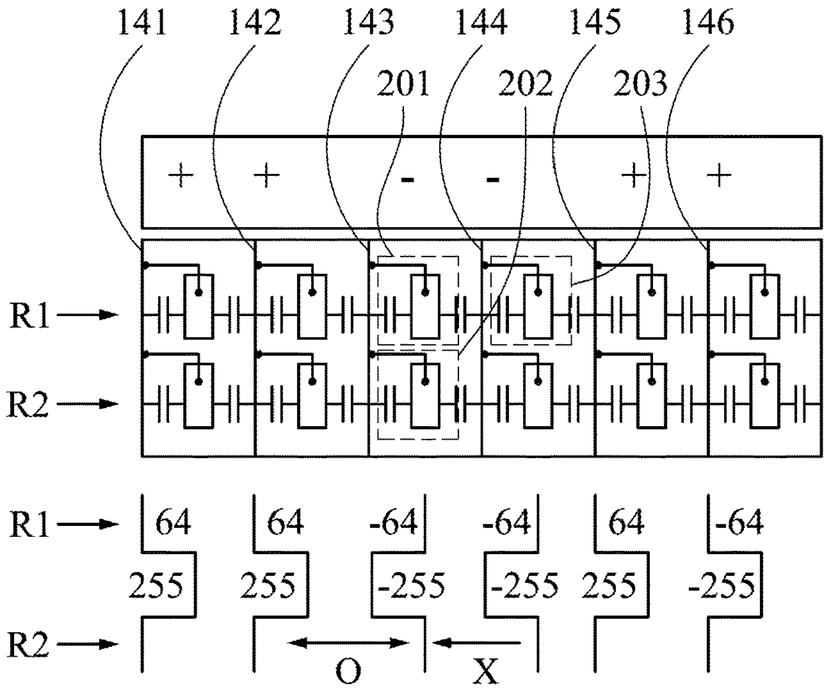

FIG. 2A and FIG. 2B are schematic diagrams of the polarization states on the data lines. Referring to FIG. 2A, the "+" symbol represents a positive polarity and the "−" symbol represents a negative polarity of the data lines. The "+" polarity indicates that the voltage on the pixel electrode is greater than the voltage on the common electrode, while the "−" polarity indicates that the voltage on the pixel electrode is less than the voltage on the common electrode. The polarization state on the data line 141 is "+" and the polarization state of the data line 142 is "−", and so on for the other data lines. FIG. 2A also illustrates sub-pixels in two rows R1 and R2, such as a sub-pixel 201 in the row R1 and a sub-pixel 202 in the row R2. The numbers below FIG. 2A represent the voltage on the corresponding pixel electrodes (sub-pixels), which are provided for illustrative purposes and do not represent volts. For example, the sub-pixel 201 and the sub-pixel 202 are both connected to the data line 143. The sub-pixel 201 is displayed before the sub-pixel 202, and the voltage on the sub-pixel 201 is "64", while the voltage on the sub-pixel 202 is "255". In other words, the voltage on the data line 143 switches from "64" to "255". Similarly, the voltages on the two sub-pixels on the data line 142 are "−64" and "−255", and the voltages on the two sub-pixels on the data line 144 are also "−64" and "−255". These voltage changes, due to capacitive coupling, affect both the sub-pixel 201 and the sub-pixel 202. However, the capacitive coupling effects of the data lines 142 and 144 to the data line 143 will cancel each other out because the polarization state of the data line 142 is different from that of the data line 143, and the polarization state of the data line 143 is also different from that of the data line 144. Specifically, the data line 142 reduces the voltage at one end of the capacitor, while the data line 144 also reduces the voltage at the other end of the capacitor, and the two effects cancel each other out. As a result, there is no cross-talk phenomenon and the brightness of the sub-pixels 201 and 202 remains unchanged.

Referring to FIG. 2B, the polarization state of the data line 142 is "+", the polarization state of the data line 143 is "−", and the polarization state of the data line 144 is "−", meaning that the polarization state of the data line 142 is different from that of the data line 143, but the polarization state of the data line 143 is the same as that of the data line 144. In this case, the capacitive coupling effects of the data lines 142 and 144 to the data line 143 cannot cancel each other out, resulting in cross-talk. In some embodiments, the polarization states of the data lines are switched after displaying a frame. For example, according to the setup in FIG. 2B, the polarization state of the data line 142 is "−", the polarization state of the data line 143 is "+", and the polarization state of the data line 144 is "+" in a previous frame. This means that the polarization state of each of the data lines 141-146 in the current frame is different from the polarization state on the same data line in the previous frame.

The present disclosure considers the polarization states of the sub-pixels to solve the cross-talk problem, and compensates for the gray levels of the sub-pixels to display the correct brightness. Referring back to FIG. 1, the circuit 110 receives an image which contains gray levels corresponding to all sub-pixels respectively. In particular, the circuit 110 includes a gray-level lookup table 111, a polarization lookup table 112, and a position lookup table 113, which are used to calculate compensation values. The calculation of the compensation values will be described in detail below.

For a currently processed sub-pixel, a corresponding previous sub-pixel is first obtained. For example, in FIG. 2B, the sub-pixel 201 is the current sub-pixel to be processed, and the sub-pixel 203 is the previous sub-pixel. It should be noted that the previous sub-pixel can be located on an adjacent data line to the current sub-pixel, or it can be located on the same data line as the current sub-pixel. In some embodiments, the display order of the previous sub-pixel precedes the display order of the current sub-pixel. For example, if the current sub-pixel is in the row R2, then the previous sub-pixel may be in the row R1. In some embodiments, the previous sub-pixel and the current sub-pixel can be separated by one or more data lines. For example, if the current sub-pixel is on the data line 143, then the previous sub-pixel nay be on the data line 141, 145, or 146. The embodiments described above can also be combined in any way. For example, the sub-pixel 202 can be the current sub-pixel, and the sub-pixel 203 can be the previous sub-pixel.

To illustrate how to compensate for the sub-pixel 201, the sub-pixel 203 is taken as the previous sub-pixel herein. First, a compensation value is calculated based on the gray levels corresponding to the sub-pixel 203 and the sub-pixel 201. When the gray level corresponding to the sub-pixel 201 is greater than the gray level corresponding to the sub-pixel 203, the compensation value is positive. When the gray level corresponding to the sub-pixel 201 is less than the gray level corresponding to the sub-pixel 203, the compensation value is negative. When the gray level corresponding to the sub-pixel 201 is equal to the gray level corresponding to the sub-pixel 203, the compensation value is zero. In some embodiments, the gray levels of the sub-pixel 203 and the sub-pixel 201 are input into the gray-level lookup table 111 to obtain the compensation value represented as $LUT_{grey}$(Pre→Cur), where Pre represents the gray level of the sub-pixel 203, Cur represents the gray level of the sub-pixel 201, and $LUT_{grey}$( ) represents the gray-level lookup table. FIG. 3 is a diagram of an example of a gray-level lookup table 300 according to an embodiment, where the first row and first column represent the indices of the lookup table, and the remaining entries represent the compensation value. Each column represents the gray level of the sub-pixel 203, while each row represents the gray level of sub-pixel 201. For example, when the gray level of the sub-pixel 203 is "64" and the gray level of the sub-pixel 201 is "256", the compensation value is "24", and so on. When the gray level of a sub-pixel does not match exactly with the indices of the lookup table, interpolation can be used to calculate the compensation value.

Next, another compensation value is calculated based on the polarization state of the sub-pixel 203, the polarization state of the sub-pixel 201, and a difference between the gray level of sub-pixel 203 and the gray level of sub-pixel 201. Specifically, there are four possible combinations based on the polarization state of the sub-pixel 203 and the polarization state of the sub-pixel 201, which are denoted as "++", "+−", "−+", and "—". In this case, four polarization lookup tables are set up, and the corresponding polarization lookup table can be selected based on the polarization state of the sub-pixel 203 and the polarization state of the sub-pixel 201. Next, the absolute difference between the sub-pixel 203's gray level and the sub-pixel 201's gray level is calculated, represented as |Cur−Pre|. This absolute difference is input into the selected polarization lookup table to obtain the second compensation value, denoted as $LUT_{POL}$(|Cur−Pre|), where $LUT_{POL}$( ) represents the selected polarization lookup table. The polarization lookup table is one-dimensional, and in some embodiments, the values in the polarization lookup table are generated based on a concave function of the absolute difference. For example, FIG. 4 shows four polarization lookup tables 401-404, representing four different combinations of polarization states, namely "++", "—", "+−", and "−+". The first column represents the index of the lookup table, and the second column represents the compensation value. Assuming that both sub-pixel 203 and sub-pixel 201 have a polarization state of "−", the polarization lookup table 402 is selected. When the absolute difference |Cur−Pre| is "192", the compensation value is "6", and so on. Furthermore, the values in the polarization lookup table 402 are approximated by a concave function that first increases and then decreases. In some embodiments, interpolation can be used to calculate the compensation value when the absolute difference |Cur−Pre| does not match the index.

Next, a gain is calculated according to the position of the sub-pixel 201. In some embodiments, the X and Y coordinates of the sub-pixel 201 are input into the position lookup table to obtain the gain. FIG. 5 shows an example of a position lookup table 500 according to one embodiment, where each column represents the X coordinate and each row represents the Y coordinate. The first row and the first column are the indices, and the rest are gains. For example, when the X coordinate is "1152" and the Y coordinate is "0", the gain is "650", and so on. The values in the position lookup table 500 depend on the placement of the surrounding circuit and other factors, and this disclosure does not limit the values in the position lookup table 500. Similarly, when the X and Y coordinates are not equal to the indices, interpolation can be used to calculate the gain.

Finally, an output gray level is obtained by compensating the gray level of the sub-pixel 201 using the calculated compensation values and the gain, as shown in the following Equation 1.

$$Cur' = Cur + LUT_{grey}(Pre \rightarrow Cur) + LUT_{POL}(|Cur - Pre|) \times \frac{\text{Gain}}{256} \quad \text{[Equation 1]}$$

Cur' is the output gray level. Gain is the aforementioned gain which is divided by "256" in this embodiment, but this division can be integrated into the position lookup table. The second compensation value $LUT_{POL}$(|Cur−Pre|) and the gain are multiplied to obtain a product, which is then added to the sub-pixel 201's gray level and the first compensation value $LUT_{grey}$(Pre→Cur) to obtain the output gray level. Finally, the sub-pixel 201 is driven based on the output gray level, which can solve the crosstalk problem.

Figure 6:
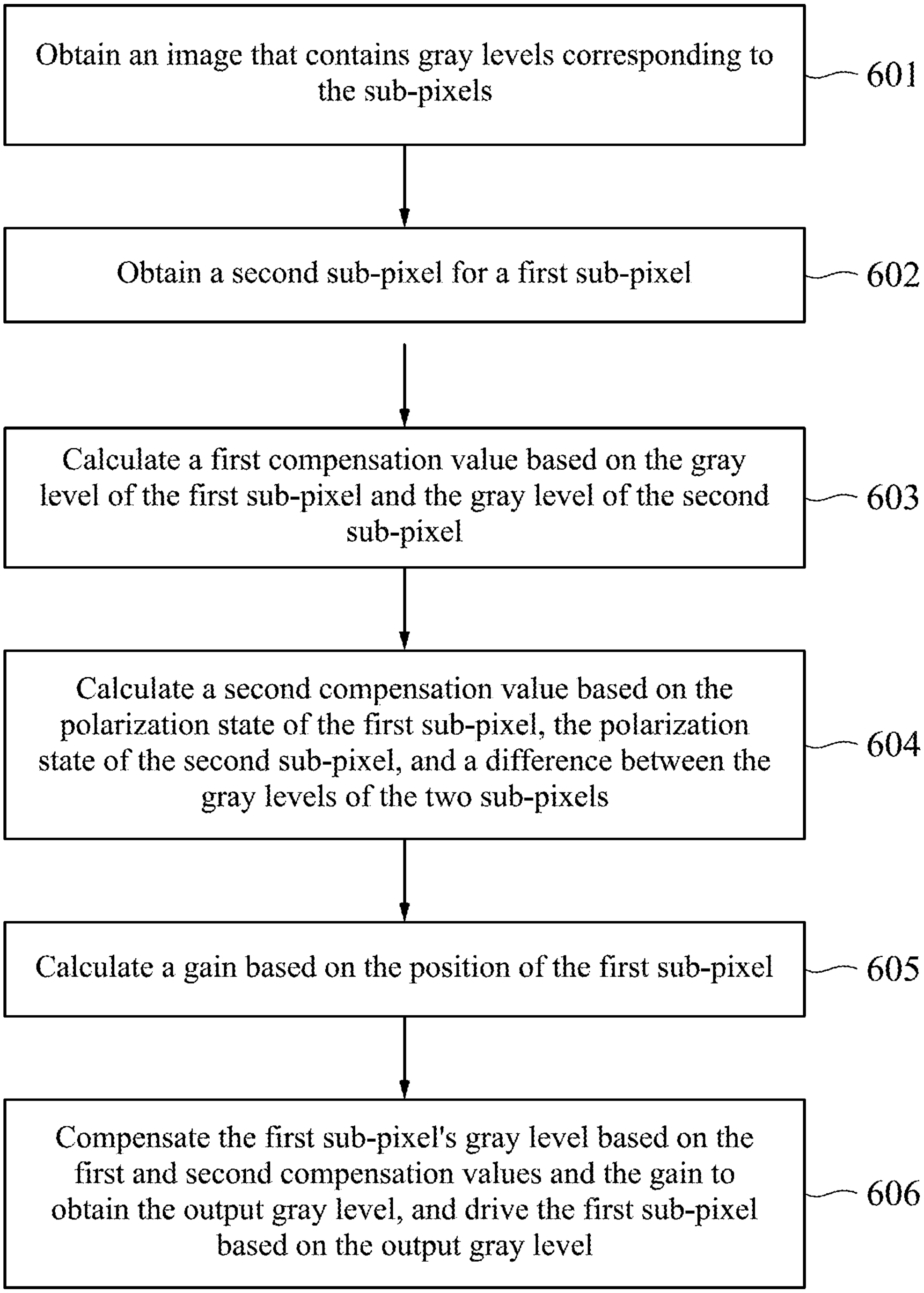
FIG. 6 is a flowchart of a method for driving a display panel according to an embodiment.

FIG. 6 is a flowchart of a method for driving a display panel according to an embodiment. Referring to FIG. 6, in step 601, an image is obtained that contains gray levels corresponding to the sub-pixels. In step 602, a corresponding second sub-pixel (i.e. previous sub-pixel) is obtained for a first sub-pixel (i.e. current sub-pixel). In step 603, a first compensation value is calculated based on the gray level of the first sub-pixel and the gray level of the second sub-pixel. In step 604, a second compensation value is calculated based on the polarization state of the first sub-pixel, the polarization state of the second sub-pixel, and a difference between the gray levels of the two sub-pixels. In step 605, a gain is calculated based on the position of the first sub-pixel. In step 606, the first sub-pixel's gray level is compensated based on the first and second compensation values and the gain, to obtain the output gray level. The first sub-pixel is then driven based on the output gray level. All the steps in FIG. 6 have been described in detail above, and therefore the description will not be repeated. Note that the steps in FIG. 6 can be implemented as program codes or circuits, and the disclosure is not limited thereto. In addition, the method in FIG. 6 can be performed with the aforementioned embodiments, or can be performed independently. In other words, other steps may be inserted between the steps of the FIG. 6.

Figure 7:
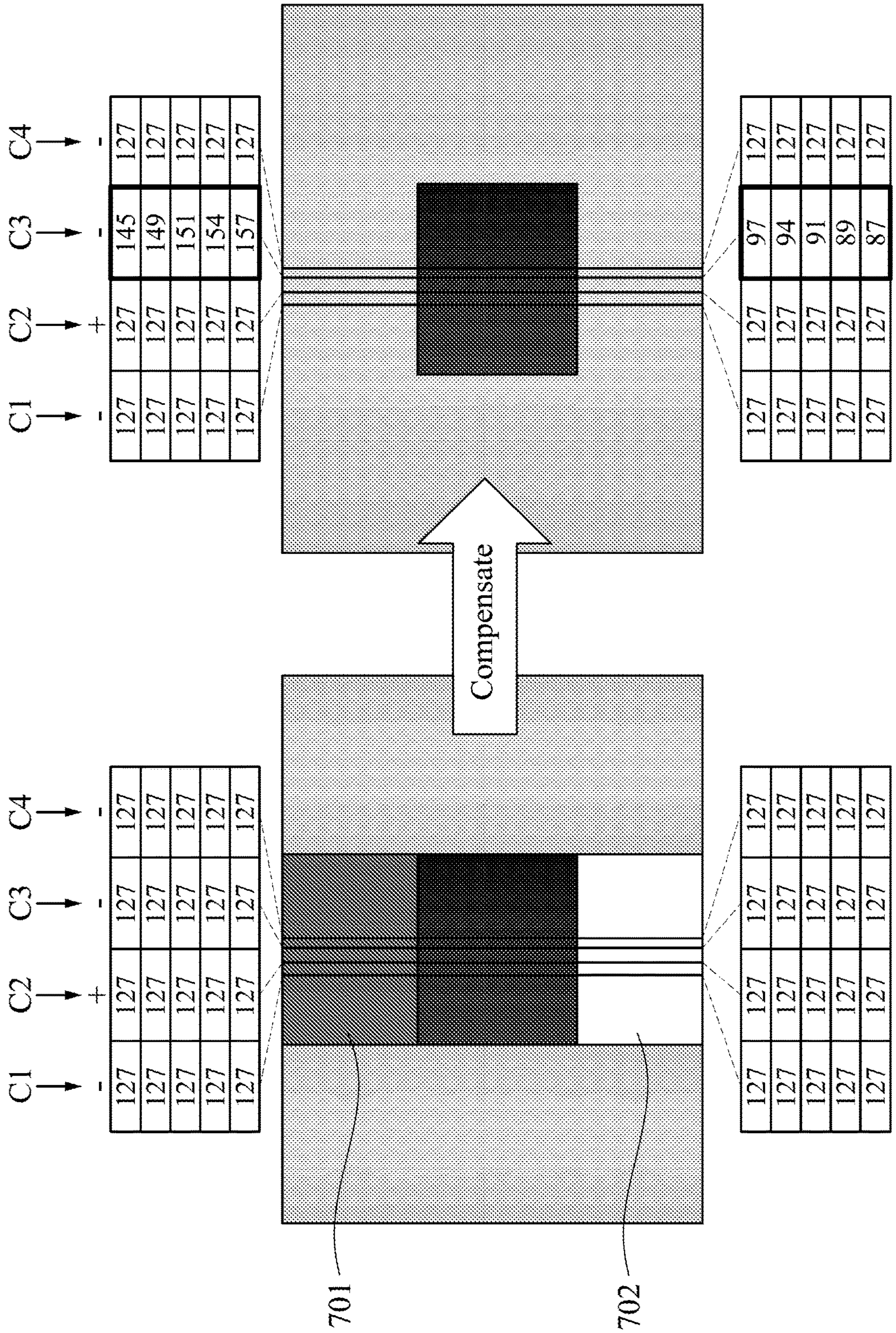
FIG. 7 is a diagram of the display brightness before and after compensation based on an embodiment.

Referring to FIG. 7, which is a diagram of the display brightness before and after compensation based on an embodiment. FIG. 7 shows the gray levels of the sub-pixels in four columns C1 to C4. The left side of the figure shows the values before compensation, and the right side shows the values after compensation. The polarization states of columns C1 to C4 are "−", "+", "−", and "−", respectively. As previously mentioned, there is crosstalk on the third column C3 due to the asymmetrical polarization states of the data lines on both sides. The crosstalk occurs every few columns, and since the distance between the occurred columns is short, the human eye still perceives a change in the brightness of the entire area. In this example, this led to a region 701 being darker than expected while a region 702 being brighter than expected. After the compensation described above, the gray levels of the third column C3 in the region 701 ranges from "145" to "157", and it ranges from "97" to "87" in the region 702. The right image of FIG. 7 shows that there is no longer crosstalk issue after the gray level compensation. The main reason for the difference in gray levels between columns C2 and C3 is due to the term of $LUT_{POL}$ (|Cur−Pre|) in the aforementioned equation 1. When the sub-pixel in the second column C2 is taken as the current sub-pixel and the previous sub-pixel is in third column C3, then the "−+" polarization lookup table is used. When the sub-pixel in the third column C3 is the current sub-pixel and the previous sub-pixel is in the fourth column C4, then the "−−" polarization lookup table is used. The different polarization lookup tables result in different values for $LUT_{POL}$ (|Cur−Pre|). Furthermore, the reason for the gray levels of the same third column C3 being different is mainly due to the gain in the above equation 1, where different Y coordinates result in different gains.

In the above-mentioned display device and method, by considering the gray levels, polarization states, and position of the sub-pixel, a better compensation of the gray level can be achieved, thereby solving the problem of vertical crosstalk.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device comprising:

a display panel comprising a plurality of sub-pixels and a plurality of data lines, wherein each of the plurality of sub-pixel is connected to one of the data lines; and a circuit, configured to obtain an image having a plurality of gray levels corresponding to the sub-pixels respectively, wherein for a first sub-pixel of the sub-pixels, the circuit is configured to obtain a second sub-pixel correspondingly, wherein the circuit is configured to calculate a first compensation value according to the gray level corresponding to the first sub-pixel and the gray level corresponding to the second sub-pixel, wherein the circuit is configured to calculate a second compensation value according to a polarization state of the first sub-pixel, a polarization state of the second sub-pixel, and a difference between the gray level corresponding to the first sub-pixel and the gray level corresponding to the second sub-pixel, wherein the circuit is configured to calculate a gain according to a position of the first sub-pixel, wherein the circuit is configured to compensate the gray level corresponding to the first sub-pixel according to the first compensation value, the second compensation value, and the gain to obtain an output gray level, and drive the first sub-pixel according to the output gray level.

2. The display device of claim 1, wherein the first sub-pixel is located on a first data line of the data lines, and the first data line is adjacent to a second data line and a third data line, wherein in a current frame, a polarization state of the first data line is identical to a polarization state of the second data line, and the polarization state of the first data line is different from a polarization state of the third data line.

3. The display device of claim 2, wherein the polarization state of the first data line in the current frame is different from the polarization state of the first data line in a previous frame, wherein the polarization state of the second data line in the current frame is different from the polarization state of the second data line in the previous frame, wherein the polarization state of the third data line in the current frame is different from the polarization state of the third data line in the previous frame.

4. The display device of claim 1, wherein the circuit is configured to input the gray level corresponding to the first sub-pixel and the gray level corresponding to the second sub-pixel into a gray-level lookup table to obtain the first compensation value.

5. The display device of claim 4, wherein the first compensation value is positive when the gray level corresponding to the first sub-pixel is greater than the gray level corresponding to the second sub-pixel, wherein the first compensation value is negative when the gray level corresponding to the first sub-pixel is less than the gray level corresponding to the second sub-pixel.

6. The display device of claim 4, wherein the circuit is configured to select one of a plurality of polarization lookup tables according to the polarization state of the first sub-pixel and the polarization state of the second sub-pixel, wherein the circuit is configured to input an absolute difference between the gray level corresponding to the first sub-pixel and the gray level corresponding to the second sub-pixel into the selected polarization lookup table to obtain the second compensation value.

7. The display device of claim 6, wherein a plurality of values in the selected polarization lookup tables are determined based on a concave function of the absolute difference.

8. The display device of claim 6, wherein the circuit is configured to input a first coordinate and a second coordinate of the first sub-pixel into a position lookup table to obtain the gain.

9. The display device of claim 8, wherein the circuit is configured to multiply the second compensation value with the gain to obtain a product, and add the gray level of the first sub-pixel, the product, and the first compensation value to obtain the output gray level.

10. A method for driving a display panel, wherein the method is performed by a circuit, the display panel comprises a plurality of sub-pixels and a plurality of data lines, each of the sub-pixels is connected to one of the data lines, and the method comprises:

obtaining an image having a plurality of gray levels corresponding to the sub-pixels respectively;

obtaining a second sub-pixel of the sub-pixels for a first sub-pixel of the sub-pixels;

calculating a first compensation value according to the gray level corresponding to the first sub-pixel and the gray level corresponding to the second sub-pixel;

calculating a second compensation value according to a polarization state of the first sub-pixel, a polarization state of the second sub-pixel, and a difference between the gray level corresponding to the first sub-pixel and the gray level corresponding to the second sub-pixel;

calculating a gain according to a position of the first sub-pixel; and compensating the gray level corresponding to the first sub-pixel according to the first compensation value, the second compensation value, and the gain to obtain an output gray level, and driving the first sub-pixel according to the output gray level.

11. The method of claim 10, wherein the first sub-pixel is located on a first data line of the data lines, and the first data line is adjacent to a second data line and a third data line, wherein in a current frame, a polarization state of the first data line is identical to a polarization state of the second data line, and the polarization state of the first data line is different from a polarization state of the third data line.

12. The method of claim 11, wherein the polarization state of the first data line in the current frame is different from the polarization state of the first data line in a previous frame, wherein the polarization state of the second data line in the current frame is different from the polarization state of the second data line in the previous frame, wherein the polarization state of the third data line in the current frame is different from the polarization state of the third data line in the previous frame.

13. The method of claim 10, further comprising:

inputting the gray level corresponding to the first sub-pixel and the gray level corresponding to the second sub-pixel into a gray-level lookup table to obtain the first compensation value.

14. The method of claim 13, wherein the first compensation value is positive when the gray level corresponding to the first sub-pixel is greater than the gray level corresponding to the second sub-pixel, wherein the first compensation value is negative when the gray level corresponding to the first sub-pixel is less than the gray level corresponding to the second sub-pixel.

15. The method of claim 13, further comprising:

selecting one of a plurality of polarization lookup tables according to the polarization state of the first sub-pixel and the polarization state of the second sub-pixel; and inputting an absolute difference between the gray level corresponding to the first sub-pixel and the gray level corresponding to the second sub-pixel into the selected polarization lookup table to obtain the second compensation value.

16. The method of claim 15, wherein a plurality of values in the selected polarization lookup table are determined based on a concave function of the absolute difference.

17. The method of claim 15, further comprising:

inputting a first coordinate and a second coordinate of the first sub-pixel into a position lookup table to obtain the gain.

18. The method of claim 17, further comprising:

multiplying the second compensation value with the gain to obtain a product, and adding the gray level of the first sub-pixel, the product, and the first compensation value to obtain the output gray level.

* * * * *